US012724579B2

(12) United States Patent
Liu et al.

(10) Patent No.: US 12,724,579 B2
(45) Date of Patent: Sep. 1, 2026

(54) IMAGE OUTPUT CONTROL METHOD AND ELECTRONIC DEVICE

(71) Applicant: Beijing Lenovo Software Ltd., Beijing (CN)

(72) Inventors: Yanming Liu, Beijing (CN); Zhe Song, Beijing (CN)

(73) Assignee: Beijing Lenovo Software Ltd., Beijing (CN)

( * ) Notice: Subject to any disclaimer, the term of this patent is extended or adjusted under 35 U.S.C. 154(b) by 0 days.

(21) Appl. No.: 19/074,370

(22) Filed: Mar. 8, 2025

(65) Prior Publication Data

US 2025/0298565 A1 Sep. 25, 2025

(30) Foreign Application Priority Data

Mar. 25, 2024 (CN) ......................... 202410345994.4

(51) Int. Cl.
*G06F 3/14* (2006.01)
*G09G 3/34* (2006.01)

(52) U.S. Cl.
CPC ............... *G06F 3/14* (2013.01); *G09G 3/344* (2013.01)

(58) Field of Classification Search
CPC .. G06F 3/14; G09G 3/344; G09G 2340/0435; G09G 5/393; G09G 5/363; G09G 5/08
See application file for complete search history.

(56) References Cited

U.S. PATENT DOCUMENTS

2015/0084908 A1* 3/2015 Jordan ..................... G09G 5/12 345/174
2023/0206884 A1* 6/2023 Lambord ............... G09G 5/393 345/156
2024/0378006 A1* 11/2024 Imanishi ................... G06F 3/14

* cited by examiner

*Primary Examiner* — Muhammad N Edun
(74) *Attorney, Agent, or Firm* — ANOVA LAW GROUP, PLLC

(57) ABSTRACT

An image output control method includes receiving a first image sent by a graphics processor, receiving cursor information generated based on a cursor change, determining a target refresh signal according to the first image, a second image, and the cursor information, and outputting the target refresh signal to the display module. The target refresh signal includes at least one refresh signal of a plurality of refresh signals. The plurality of refresh signals are used to cause a display module to perform a plurality of refreshes to transition from displaying the second image to displaying the first image.

15 Claims, 7 Drawing Sheets

IMAGE OUTPUT CONTROL METHOD AND ELECTRONIC DEVICE

CROSS-REFERENCE TO RELATED APPLICATION

The present disclosure claims priority to Chinese Patent Application No. 202410345994.4, filed on Mar. 25, 2024, the entire content of which is incorporated herein by reference.

TECHNICAL FIELD

The present disclosure is related to the image processing technology field and, more particularly, to an image output control method and an electronic device.

BACKGROUND

Currently, an e-ink screen typically refreshes a frame of an image according to a plurality of refresh unit time lengths corresponding to a screen refresh rate. A cursor in the image is also refreshed at the corresponding time length. Thus, a movement trajectory of the cursor is discontinuous during movement due to a relatively long refresh time length.

SUMMARY

An aspect of the present disclosure provides an image output control method. The method includes receiving a first image sent by a graphics processor, receiving cursor information generated based on a cursor change, determining a target refresh signal according to the first image, a second image, and the cursor information, and outputting the target refresh signal to the display module. The target refresh signal includes at least one refresh signal of a plurality of refresh signals. The plurality of refresh signals are used to cause a display module to perform a plurality of refreshes to transition from displaying the second image to displaying the first image.

An aspect of the present disclosure provides an electronic device, including a graphics processor, a display module, and a controller. The controller is configured to receive a first image sent by the graphics processor, receive cursor information generated based on a cursor change, determine a target refresh signal according to the first image, a second image, and the cursor information, and output the target refresh signal to the display module. The target refresh signal includes at least one refresh signal of a plurality of refresh signals. The plurality of refresh signals are used to cause a display module to perform a plurality of refreshes to transition from displaying the second image to displaying the first image.

DETAILED DESCRIPTION OF THE EMBODIMENTS

The technical solutions in embodiments of the present disclosure are described in detail in conjunction with the accompanying drawings of embodiments of the present disclosure. Apparently, the described embodiments are only a part of embodiments of the present disclosure, not all the embodiments. Based on embodiments of the present disclosure, all other embodiments obtained by those of ordinary skill in the art without creative effort shall fall within the scope of the present disclosure.

Figure 1:
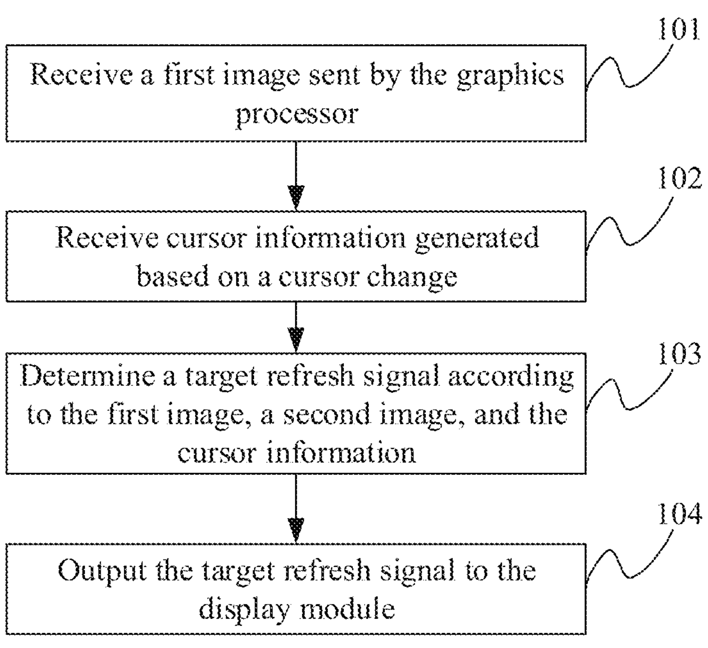
FIG. 1 is a schematic flowchart of an image output control method according to some embodiments of the present disclosure.

FIG. 1 is a schematic flowchart of an image output control method according to some embodiments of the present disclosure. The method can be applied to an electronic device having a graphics processor and a display module capable of display control, such as a cell phone or tablet. The technical solutions of embodiments of the present disclosure can be executed on a controller configured in the electronic device, such as a Field Programmable Gate Array (FPGA), which is primarily configured to improve a display effect of a cursor during an image refresh process.

In some embodiments, the method of embodiments of the present disclosure includes the following steps.

At 101, a first image sent by the graphics processor is received.

The first image can be image data that needs to be refreshed and displayed by a display module. The display module can currently display a second image and needs to transition from displaying the second image to displaying the first image.

In embodiments of the present disclosure, after receiving the first image, the first image can be cached in a specific storage location, such as a register.

At 102, cursor information generated based on a change in the cursor is received.

The change in the cursor may occur at any moment during the image refresh process, such as an initial moment, intermediate moment, or later moment during the process of the display module transitioning from displaying the second image to displaying the first image.

The cursor information can include information corresponding to at least one cursor change. The cursor change can include a change in the cursor image, and/or a change in the cursor position. The cursor information can be obtained from the graphics processor or from the driver corresponding to the cursor. Accordingly, the cursor information can include the cursor image and/or the cursor position. The cursor image can refer to the shape of the cursor, such as an arrow, butterfly, hourglass, palm, etc., while the cursor position can refer to the coordinate information of the cursor, such as the pixel coordinates of the cursor in the image. In some embodiments, if only the cursor image changes, the cursor information can include the changed cursor image. In some other embodiments, if only the cursor position changes, the cursor information can include the changed cursor position. In yet some other embodiments, if both the cursor image and the cursor position change, the cursor information can include both the changed cursor image and the changed cursor position.

In some embodiments, the graphics processor can generate cursor information when the cursor changes. In embodiments of the present disclosure, the cursor information generated by the graphics processor can be received.

At 103, a target refresh signal is determined according to the first image, the second image, and the cursor information.

The target refresh signal can include at least one of a plurality of refresh signals. The plurality of refresh signals can be used for the display module to perform a plurality of refreshes. That is, the display module can perform one refresh according to a refresh signal. After the plurality of refreshes, the display module can transition from displaying the second image to displaying the first image. The refresh signal can be a driving signal with a specific voltage waveform and used to allow a plurality of pixel units of the display module to change display colors of the plurality of pixel units through a control electric field formed by the refresh signal.

Figure 2:
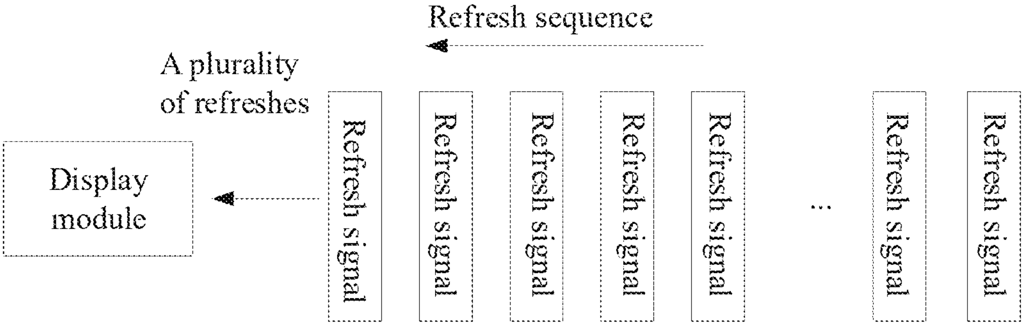
FIG. 2 is a schematic diagram of a plurality of refresh signals when a display module refreshes a plurality of times of refreshing according to some embodiments of the present disclosure.

The plurality of refresh signals used by the display module to perform the plurality of refreshes can have a refresh sequence. As shown in FIG. 2, the display module performs the plurality of refreshes continuously based on the corresponding refresh signals according to the refresh sequence.

Figure 3:
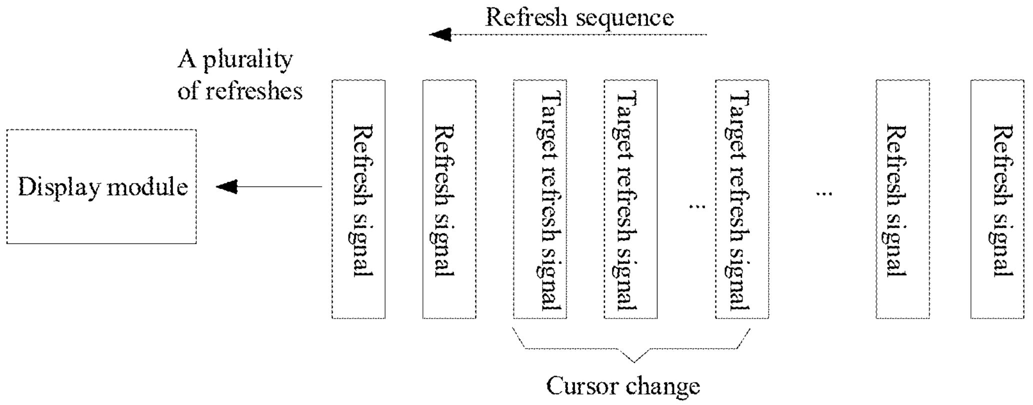
FIG. 3 is a schematic diagram showing at least a target refresh signal corresponding to a cursor change included in a plurality of refresh signals according to some embodiments of the present disclosure.

In the plurality of refresh signals, one or more target refresh signals can be provided. When a plurality of target refresh signals are provided, the target refresh signals can have a corresponding refresh sequence. As shown in FIG. 3, during the process of the display module continuously performing the plurality of refreshes based on the corresponding refresh signals according to the refresh sequence, at least one refresh is performed according to a target refresh signal.

At least the last refresh signal in sequence of the target refresh signals can correspond to the first image after the cursor is changed. Thus, the changed cursor can be displayed by the display module when performing a refresh according to the target refresh signal.

Furthermore, the first refresh signal in sequence of the target refresh signals can at least correspond to the second image before the cursor change. Thus, the cursor before the change may no longer be displayed when the display module performs refreshes according to the target refresh signal.

Figure 4:
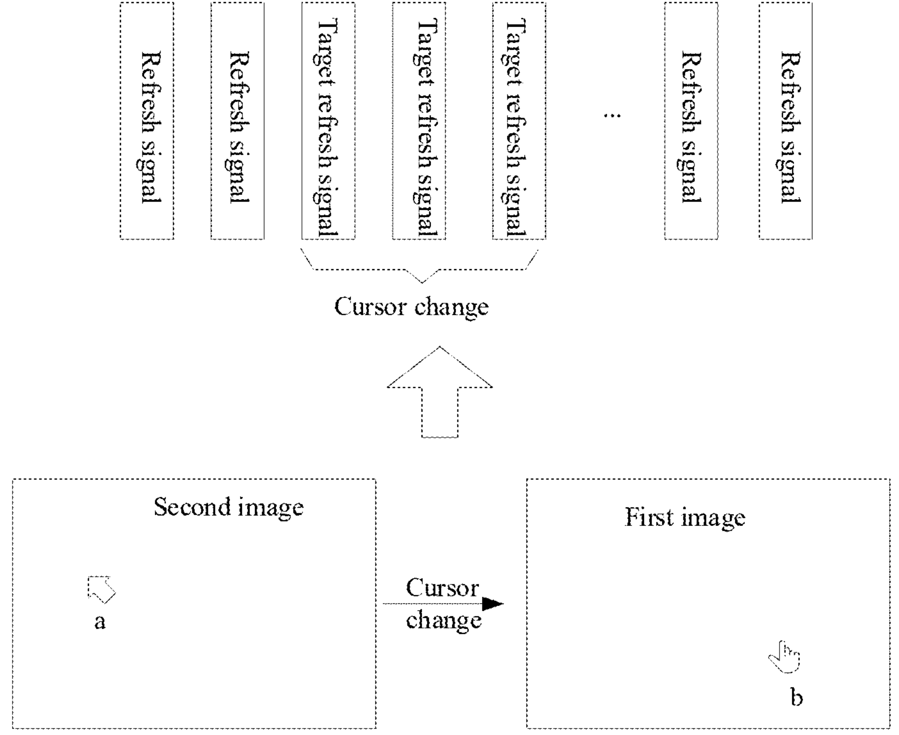
FIG. 4 is a schematic diagram showing a plurality of target refresh signals corresponding to cursor changes included in a plurality of refresh signals during an image refreshing process according to some embodiments of the present disclosure.

In the plurality of target refresh signals, for the same cursor change, the number of the target refresh signals corresponding to the transition from displaying the cursor to displaying no cursor can be equal to the number of the target refresh signals corresponding to the transition from displaying no cursor to displaying the cursor. For example, as shown in FIG. 4, when the cursor moves from position a to position b, the target refresh signals determined according to the change information generated based on the cursor change in embodiments of the present disclosure allow the cursor image at position a to gradually disappear while allowing the cursor image at position b to gradually appear. Then, three target refresh signals can be provided for the transitioning from displaying the cursor image at position a to not displaying the cursor image at position a. Similarly, three target refresh signals can be provided for the transitioning from not displaying the cursor image at position b to displaying the cursor image at position b.

At 104, the target refresh signal is output to the display module.

Among the plurality of refresh signals used for the display module to perform the plurality of refreshes, at least one target refresh signal obtained according to the first image, the second image, and the cursor information can be provided. Thus, during the process of the display module transitioning from displaying the second image to displaying the first image, the display module can perform at least one refresh according to the refresh signal according to the changed cursor to cause the cursor to be refreshed and displayed at least once.

In embodiments of the present disclosure, when tft is a refresh unit time length divided according to the screen refresh rate of the display module, the display module can perform image refreshes based on the refresh cycles of a target number of tft per second by taking tft as a basic unit time length for refreshing. Based on this, the display module can perform a plurality of refreshes according to each refresh signal of the plurality of refresh signals within the target number of tft to transition from displaying the second image to displaying the first image. In each tft, one refresh can be performed according to a refresh signal. For example, the screen refresh rate can correspond to 10 tfts. In some embodiments, the display module can perform refreshes in sequence according to 10 refresh signals. At least one target refresh signal can be provided in the 10 refresh signals. In each tft, the refreshes can be performed according to the refresh signals to cause the display module to transition from displaying the second image to displaying the first image. In this process, in at least one tft, the display module can refresh and display the changed cursor according to the target refresh signal.

Thus, in the image output control method of embodiments of the present disclosure, after the first image sent by the graphics processor is received, the cursor information generated based on the cursor change can be received to further determine the target refresh signal according to the last frame of the second image, the first image, and the cursor information. The target refresh signal can be at least one of the plurality of refresh signals. The plurality of refresh signals can be used to cause the display module to perform a plurality of refreshes to transition from displaying the second image to displaying the first image. Based on this, after outputting the target refresh signal to the display module, the changed cursor can be displayed through the target refresh signal. Thus, in embodiments of the present disclosure, during the process of the display module transitioning from displaying the second image to displaying the first image, the cursor of at least one change can be refreshed and displayed according to the change in the cursor. Then, the cursor may not only be refreshed and displayed with the second image and the first image. Thus, by adding the number of times in displaying the cursor during the image refresh process, the trajectory of the cursor can be continuous during the image refresh process to improve the display effect of the cursor during the image refresh process.

Figure 5:
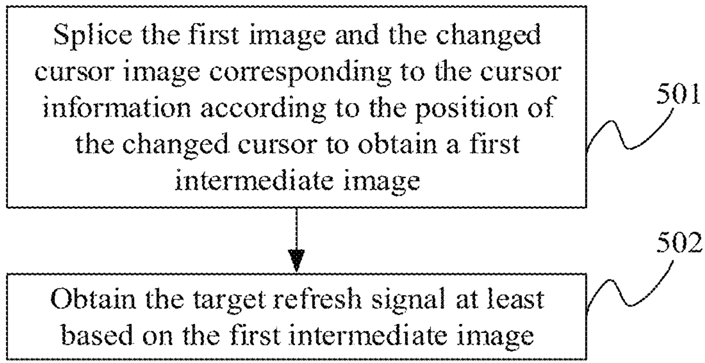
FIG. 5 is a schematic partial flowchart of an image output control method according to some embodiments of the present disclosure.

In some embodiments, as shown in FIG. 5, step 103 of determining the target refresh includes the following steps.

At 501, the first image and the changed cursor image corresponding to the cursor information are spliced according to the position of the changed cursor to obtain a first intermediate image.

Figure 6:
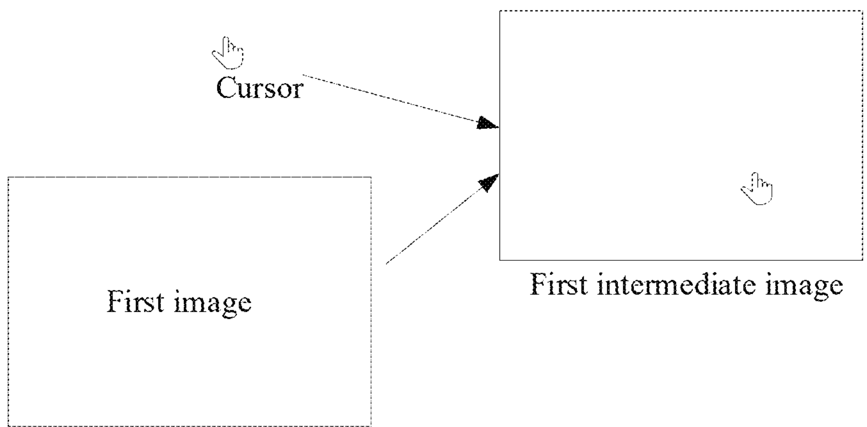
FIG. 6 is a schematic diagram showing stitching a cursor image and a first image according to some embodiments of the present disclosure.

For example, as shown in FIG. 6, in step 501, the changed cursor image is overlaid onto the region of the first image corresponding to the position of the changed cursor to obtain the first intermediate image. The first intermediate image can be data including pixel parameters corresponding to the plurality of pixels. The first intermediate image can merely include string data of the data including the pixel parameters corresponding to the plurality of pixels, which is not necessarily required to be data of a specific image format that can be displayed by a device.

The changed cursor image and the position of the changed cursor in step 501 can refer to the cursor image and the cursor position that need to be displayed in the first image. Correspondingly, the cursor image and the cursor position before the change can refer to the original cursor image and the original cursor position displayed in the second image.

The changed cursor image may be the same as or different from the cursor image before the change, and the changed cursor position can be the same as or different from the cursor position before the change. For example, if the cursor changes, the cursor image can change from an arrow image to a circle image. Then, the changed cursor image can be different from the cursor image before the change. If the cursor image remains unchanged when the cursor changes, the changed cursor image can be the same as the cursor image before the change. For another example, if the cursor moves when the cursor changes, the changed cursor position can be different from the cursor position before the change. If the cursor remains still when the cursor changes, the changed cursor position can be the same as the cursor position before the change.

At 502, the target refresh signal is obtained at least based on the first intermediate image.

In some embodiments, in step 502, pixel values can be compared between the first intermediate image and the second image according to corresponding pixel positions to determine a pixel value difference for each corresponding pixel in the first intermediate image and the second image. Then, the target refresh signal can be determined according to the pixel value difference of each corresponding pixel. Thus, the last refresh signal in sequence of the target refresh signals can correspond to the first image after the cursor changes. The first image can at least include the changed cursor image. The first refresh signal in sequence of the target refresh signals can correspond to the second image. The second image can include the cursor image before the change or not include the cursor image before the change. Based on this, the changed cursor image can be refreshed and gradually displayed by the display module in sequence according to the target refresh signal.

In some other embodiments, in step 502, the pixel values can be compared between the first intermediate image and the second intermediate image according to the corresponding pixel positions to determine the pixel value difference of each corresponding pixel between the first intermediate image and the second intermediate image. Then, the target refresh signal can be determined according to the pixel value difference of each corresponding pixel. The second intermediate image can be an image obtained by splicing the second image with the image corresponding to the cursor information according to the cursor position before the change. The second intermediate image can include data including pixel parameters corresponding to the plurality of pixels. The second intermediate image can be string data of the data including the pixel parameters corresponding to the plurality of pixels and may not be necessarily required to be data of a specific image format displayed by the device. Thus, the last refresh signal in sequence of the target refresh signals can correspond to the first image after the cursor changes. The first image can at least include the changed cursor image. The first refresh signal in sequence of the target refresh signals can correspond to the first image before the cursor changes. The second image can include the cursor image before the change. Based on this, the cursor image before the change can be refreshed in sequence with the target refresh signal and may be gradually not displayed by the display module. The changed cursor image can be refreshed in sequence with the target refresh signal and may be gradually displayed by the display module.

In the plurality of refresh signals used by the display module to perform refreshes, except for the target refresh signal, the other refresh signals can be obtained by performing the pixel value comparison on the first image and the second image according to the corresponding pixel positions to obtain the other refresh signals of the plurality of refresh signals except for the target refresh signal.

For example, the screen refresh rate can correspond to 10 tfts. In embodiments of the present disclosure, the pixel value comparison can be performed on the first image and the second image according to the corresponding pixel positions to obtain a comparison result. Then, a lookup table can be used to determine the other refresh signals except for the target refresh signal in each tft. The target signal can be obtained by performing the pixel value comparison on an image, which is obtained by splicing the first image with the changed cursor image, and the second image.

In some other embodiments, in step 103, determining the target refresh signal can include performing adjustment on a signal corresponding to the target pixel region of the at least one refresh signal of the plurality of initial signals according to the cursor information to obtain the target refresh signal.

The plurality of initial signals can be obtained according to the first image and the second image. For example, the pixel value comparison can be performed on the first image and the second image according to the corresponding pixel positions to obtain the plurality of initial signals. The plurality of initial signals can be used to obtain the plurality of refresh signals used by the display module to perform a plurality of refreshes. The target pixel region can be the pixel regions corresponding to the cursors in the first image and the second image. For example, the target pixel region can include the region of the cursor before the change in the second image and/or the region of the changed cursor in the first image.

In some embodiments, according to the cursor image and/or the cursor position of the cursor information, the signal of the at least one refresh signal of the plurality of initial signals corresponding to the target pixel region can be adjusted to obtain the target refresh signal.

For example, in embodiments of the present disclosure, according to the changed cursor image and/or the changed cursor position, the signal adjustment can be only performed on the refresh signal of the plurality of initial signals corresponding to the pixel region of the cursor image, without performing the adjustment on all the initial signals, to obtain the plurality of refresh signals. The plurality of refresh signals can at least include one target refresh signal. The target refresh signal can be the refresh signals obtained by adjusting some signals corresponding to the pixel region of the cursor image.

Thus, in embodiments of the present disclosure, the adjustment can be performed on some signals of the refresh signals of the display module. Based on this, in the process of the display module performing a plurality of refreshes according to the refresh signals, the cursor image before the change can be refreshed in sequence with the target refresh signal and gradually not displayed by the image module, and the changes cursor image can be refreshed in sequence with the target refresh signal and displayed by the display module.

Figure 7:
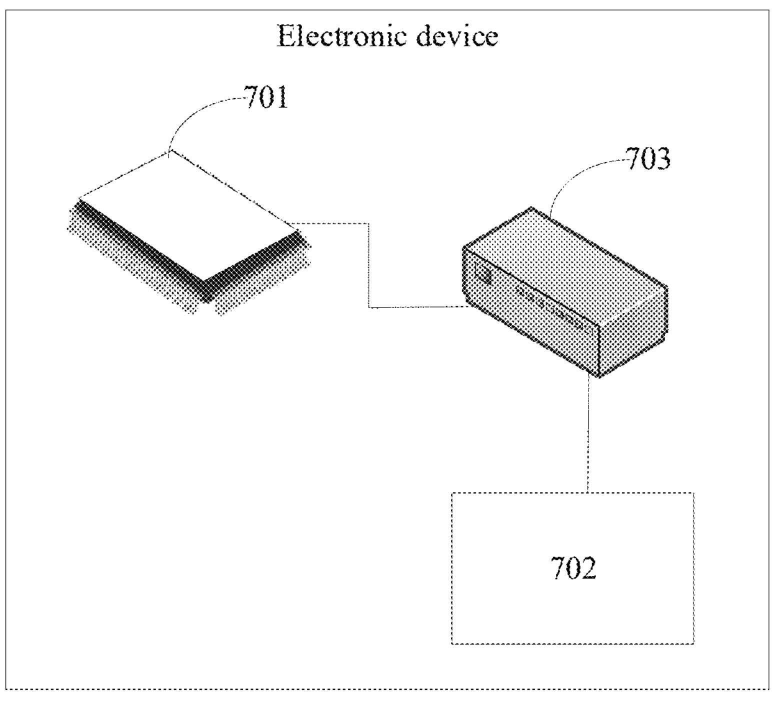
FIG. 7 is a schematic structural diagram of an electronic device according to some embodiments of the present disclosure.

FIG. 7 is a schematic structural diagram of an electronic device according to some embodiments of the present disclosure. The electronic device includes a graphics processor 701, e.g., a graphics processing unit (GPU), a display module, e.g., an e-ink screen, and a controller 703, e.g., FPGA.

The controller 703 can be configured to receive the first image sent by the graphics processor 701, receive the cursor information generated based on the change in the cursor, determine the target refresh signal according to the first image, the second image, and the cursor information, and output the target refresh signal to the display module 702. The target refresh signal can be at least one of the plurality of refresh signals. The plurality of refresh signals can be used to allow the display module 702 to perform a plurality of refreshes to transition from displaying the second image to displaying the first image.

From the above technical solution, in the image output control method of embodiments of the present disclosure, after the first image sent by the graphics processor is received, the cursor information generated based on the change in the cursor can be received. Then, based on the last frame of the second image, the first image, and the cursor information, the target refresh signal can be determined. The target refresh signal can be at least one of the plurality of refresh signals. The plurality of refresh signals can be used to allow the display module to perform the plurality of refreshes to transition from displaying the second image to displaying the first image. Based on this, after the target refresh signal is output to the display module, the changed cursor can be displayed through the target refresh signal. Then, in embodiments of the present disclosure, in the process of the display module transitioning from displaying the second image to displaying the first image, the cursor in the at least one change can be refreshed and displayed according to the change in the cursor, and the cursor may not only be refreshed and displayed with the second image and the first image. Thus, by adding the number of times of displaying the cursor during the image refresh process, the trajectory of the cursor can be continuous in the image refresh process to improve the cursor display effect during the image refresh process.

For example, the electronic device can be a cell phone or a tablet having an electrophoresis display (EPD), e.g., an e-ink screen. The technical solutions of the present disclosure can be described below.

To address issues such as cursor lag and low frame rates of the e-ink screen due to the limitation of a tft refresh mechanism and MIPI frame rate, currently, the number of times for the refreshes of tft of the full screen can be reduced, and the resolution and frame rate of the MIPI source input can be changed. However, the solution can cause the display quality of the full screen to be poor, which affects the user experience.

For the above problems, in the present disclosure, the limitation of each frame containing 10 tfts or 40 tfts for the screen (i.e., e-ink screen) can be broken. Each tft can be used as the basic unit for refreshing the cursor. By applying forward refresh on the cursor of the current coordinate and reverse refresh on the cursor of the last coordinate, the point number of the cursor displayed in the movement can be enhanced. Then, by increasing the frame rate of the cursor, the number of times of displaying the cursor can be increased according to the change in the cursor during the image refresh process to cause the moving trajectory of the cursor to be continuous to improve the user experience.

The technical solutions of the present disclosure are described in detail below.

Figure 8:
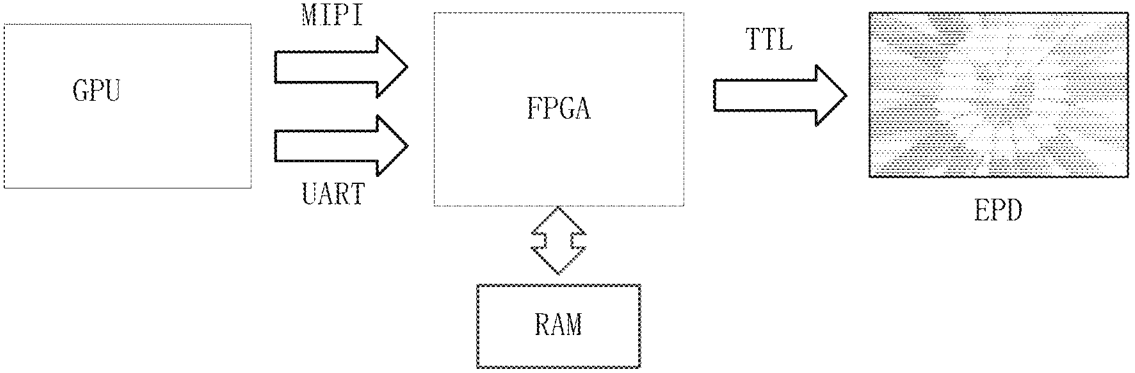
FIG. 8 is a schematic architectural diagram of a system for EPD performing image refreshing according to some embodiments of the present disclosure.

First, based on the system architecture shown in FIG. 8, in the present disclosure, the coordinate of the cursor movement (i.e., cursor position) and the shape information of the current cursor (i.e., cursor image, such as an arrow, butterfly, hourglass, palm, etc.) captured by a host end (i.e., GPU) are transmitted to FPGA (the FPGA is configured on a driver board of the e-ink screen). The FPGA can then perform refreshes on the cursor image according to the parsed cursor coordinate information and cursor image information. A maximum refresh number of tfts can be 10. In embodiments of the present disclosure, the screen refresh rate can be 10 tfts per second).

The PRGA and EPD can realize data transmission through a transistor-transistor logic (TTL).

Based on this, in the present disclosure, the coordinate information received based on the channel of Universal Asynchronous Receiver/Transmitter (UART) (i.e., the channel between the GPU and FPGA) can be stored in the register RAM. The RAM can include RAM1 and RAM2. In the present disclosure, the cursor image information can be stored in RAM1, and the corresponding position of the cursor on the screen is located to perform forward refresh. That is, the current cursor can be gradually displayed through a plurality of refreshes. If the cursor image remains unchanged, only the cursor position information may need to be transmitted without transmitting the cursor image information, which effectively reduces transmission delay. Each time after new cursor information is received, the new cursor can be forward refreshed while the last cursor can be refreshed reversely. That is, the last cursor may gradually be not displayed by performing the plurality of refreshes on the last cursor. If the cursor image information changes, the new cursor image information can be transmitted and stored in RAM 2. The reverse refresh can be performed for the same number of forward refreshes on the cursor image of the last coordinate according to the image information of RAM 1. The forward refresh can be performed at the current cursor position according to the cursor image information in RAM 2.

Figure 9:
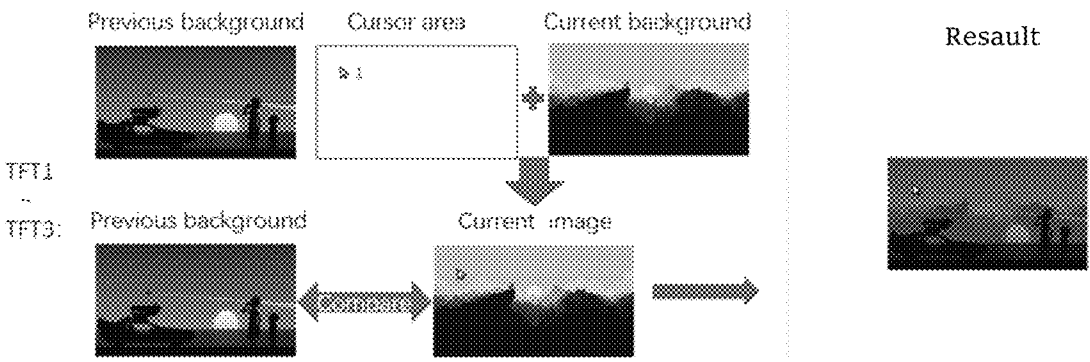
FIG. 9 is a schematic diagram of tft1-tft3 images during a process of EPD performing image refreshing according to some embodiments of the present disclosure.

In tft1-tft3, the position of cursor 1 (i.e., the changed cursor) and the image information enter the FPGA. Then, the information that needs forward refresh can be obtained. The cursor 1 in the cursor area can be combined with the current background (i.e., the first image above) to obtain the corrected current image information (i.e., the first intermediate image above). Then, the content comparison can be performed on the corrected current image information and the previous background (i.e., the second image above) to look up a table to obtain the intermediate process image shown in FIG. 9, i.e., Resault.

Figure 10:
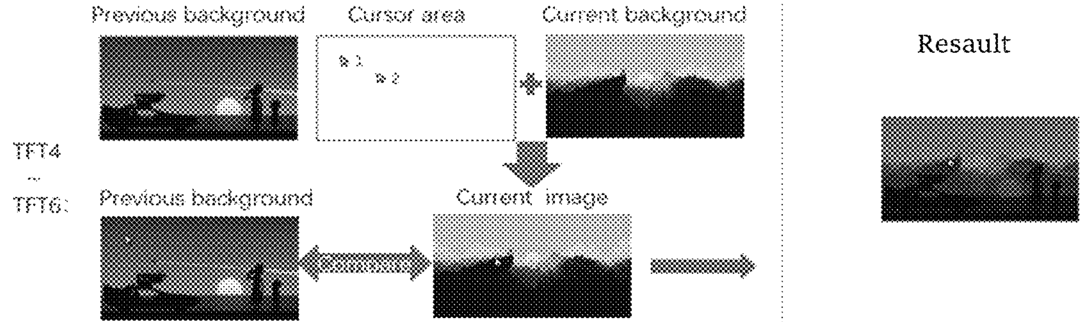
FIG. 10 is a schematic diagram of tft4-tft6 images during a process of EPD performing image refreshing according to some embodiments of the present disclosure.

In tft4-tft6, since cursor 2 (i.e., the cursor after another change) and cursor 1 have the same image information, only the coordinate information may need to be transmitted into FPGA to obtain the information that needs forward refresh. Cursor 2 in the cursor area can be combined with the current background to obtain the corrected current image information. Cursor 1 and the previous background can be combined to obtain the corrected previous background, i.e., the second intermediate image above. The contents of the corrected previous background and the current background can be compared to look up the table, i.e., compare. Then, cursor 1 can be reversely refreshed, and cursor 2 can be displayed on the screen to obtain the intermediate process image shown in FIG. 10.

Figure 11:
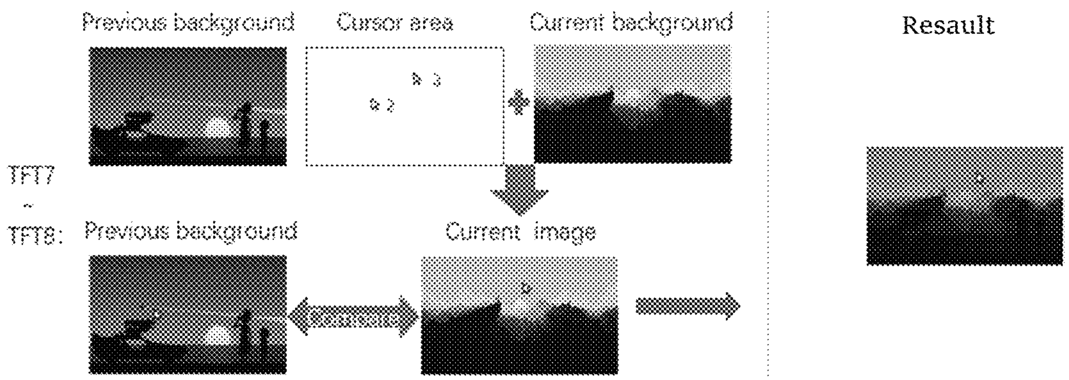
FIG. 11 is a schematic diagram of tft7 and tft8 images during a process of EPD performing image refreshing according to some embodiments of the present disclosure.

In tft7 and tft8, since cursor 3 (the cursor that changes for another time) and cursor 2 have the same image information, only the coordinate information may need to be transmitted to the FPGA to obtain the information that needs forward refresh. Cursor 3 in the cursor area and the current background can be combined to obtain the corrected current image information. Cursor 2 and the previous background can be combined to obtain the corrected previous background. The comparison can be performed on the contents of the corrected previous background and the current background to look up the table. Since cursor 2 is forward refreshed for 3 tfts during tfts 4-6 and is reversely refreshed for 2 tfts in tfts 7 and 8, a relatively shallow mark of cursor 2 can be resulted. Meanwhile, cursor 3 is forward refreshed for 2 tfts to obtain the intermediate process image Resault shown in FIG. 11.

Figure 12:
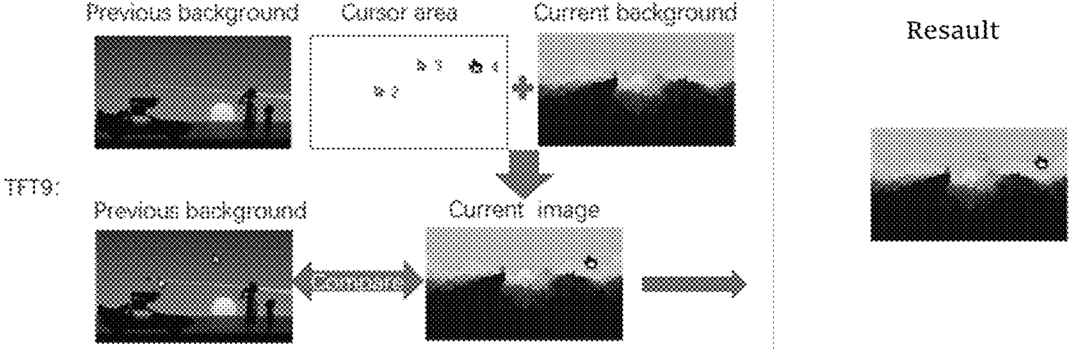
FIG. 12 is a schematic diagram of a tft9 image during a process of EPD performing image refreshing according to some embodiments of the present disclosure.

In tft 9, since cursor 4 and cursor 3 have different image information, the image information and coordinate information of cursor 4 can be transmitted into FPGA to obtain the information that needs the forward refresh. Cursor 4 of the cursor area can be combined with the current background to obtain the corrected current image information. Since cursor 2 is not finished with the reverse refreshes, cursor 2, cursor 3, and the previous background may need to be combined to obtain the corrected previous background. The contents of the corrected previous background and the current background can be compared to look up the table. Since cursor 3 is only refreshed for 1 tft, a relatively shallow mark of cursor 3 can be resulted at the end of tft 9 to obtain the intermediate process image Resault shown in FIG. 12.

Figure 13:
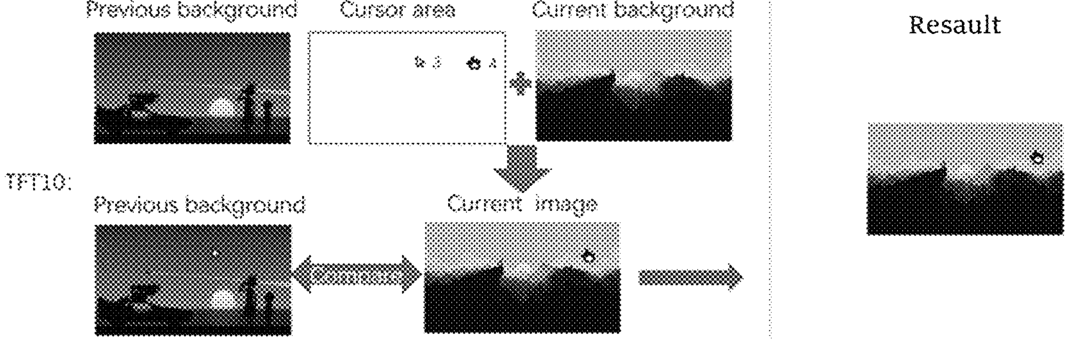
FIG. 13 is a schematic diagram of a tft10 image during a process of EPD performing image refreshing according to some embodiments of the present disclosure.

In tft 10, since the number of reverse refresh for cursor 2 in tft 9 is sufficient for cursor 2 to complete the reverse refresh, the information of cursor 2 can be removed from the cursor area. Cursor 4 of the cursor area can be combined with the current background to obtain the corrected current image information. Cursor 3 can be combined with the previous background to obtain the corrected previous background. The contents of the corrected previous background and the current background can be compared to look up the table to complete the reverse refresh of cursor 3 and the forward refresh of cursor 4 to obtain the intermediate process image Resault shown in FIG. 13.

If cursor 4 remains still, the refresh can continue to be performed for the remaining 8 tfts. If a new cursor coordinate and image information are received in between, the above process can be repeated to perform the refresh on the cursor. However, in MIPI, the cursor can only be refreshed at the position of the coordinate of cursor 1 in tft 1 to tft 10. In the method of refreshing the cursor with each tft as a cycle, the cursor can be moved while the background changes, and the frame rate of the cursor during the movement can be increased to obtain a smoother cursor movement effect.

Thus, with the technical solutions of the present disclosure, the user can experience smoother and more responsive cursor movement when using a computer having an e-ink screen.

Embodiments of the present disclosure are described in a progressive manner. Each embodiment focuses on the difference from other embodiments. The same or similar parts of embodiments can be referred to each other. Since the apparatus of embodiments of the present disclosure corresponds to the method of embodiments of the present disclosure, the description can be simple. For the related place, reference can be made to the description of the method.

Those skilled in the art can understand that exemplary units and algorithm steps of embodiments of the present disclosure can be implemented by electronic hardware, computer software, or a combination thereof. To clearly describe the interchangeability between the hardware and software, the composition and steps of embodiments of the present disclosure are generally described in terms of functionality. Whether these functions are executed in hardware or software depends on the specific application and design constraints of the technical solutions. Those skilled in the art can implement the described function in different methods for each specific application, which should not be considered to excess the scope of the present disclosure.

The steps of the methods or algorithms of embodiments of the present disclosure can be implemented directly using hardware, a software module executed by a processor, or a combination thereof. The software module can be stored in RAM, memory, ROM, electrically programmable ROM, electrically erasable programmable ROM, register, hard disk, removable disk, CD-ROM, or any other form of storage medium known in the technical field.

The above description of embodiments of the present disclosure can enable those skilled in the art to implement and use the present disclosure. Various modifications to these embodiments can be obvious to those skilled in the art. The general principle defined in the present disclosure can be implemented in other embodiments without departing from the spirit or scope of the present disclosure. Thus, the present disclosure is not limited to embodiments of the present disclosure but conforms to the widest scope consistent with the principle and novel features of the present disclosure.

What is claimed is:

1. An image output control method comprising:

receiving a first image sent by a graphics processor;

receiving cursor information generated based on a cursor change;

determining a target refresh signal according to the first image, a second image, and the cursor information, the target refresh signal including at least one refresh signal of a plurality of refresh signals, and the plurality of refresh signals being used to cause a display module to perform a plurality of refreshes to transition from displaying the second image to displaying the first image; and outputting the target refresh signal to the display module;

wherein determining the target refresh signal according to the first image, the second image, and the cursor information includes:

splicing the first image with a changed cursor image corresponding to the cursor information according to a changed cursor position to obtain a first intermediate image; and obtaining the target refresh signal at least according to the first intermediate image.

2. The method according to claim 1, wherein obtaining the target refresh signal at least according to the first intermediate image includes:

performing pixel value comparison on the first intermediate image and a second intermediate image according to corresponding pixel positions to obtain the target refresh signal;

wherein the second intermediate image is an image obtained by splicing the second image with a cursor image corresponding to the cursor information according to a cursor position before the change.

3. The method according to claim 1, further comprising:

performing pixel value comparison on the first image and the second image at corresponding pixel positions to obtain other refresh signals of the plurality of refresh signals except for the target refresh signal.

4. The method according to claim 1, wherein:

a plurality of target refresh signals are provided, and the plurality of target refresh signals have a refresh sequence;

a first refresh signal in sequence of the target refresh signals at least corresponds to the second image before the cursor change; and a last refresh signal in the sequence of the target refresh signals at least corresponds to the first image after the cursor change.

5. The method according to claim 4, wherein:

in the plurality of target refresh signals, for the same cursor change, a number of target refresh signals for transitioning from displaying the cursor to not displaying the cursor is equal to a number of target refresh signals for transitioning from not displaying the cursor to displaying the cursor.

6. The method according to claim 1, wherein:

the cursor information includes information corresponding to at least one cursor change; and the cursor change includes a cursor image change and/or cursor position change.

7. An electronic device comprising:

a graphics processor;

a display module; and a controller configured to perform the method according to claim 1.

8. The device according to claim 7, wherein the controller is further configured to:

perform pixel value comparison on the first intermediate image and a second intermediate image according to corresponding pixel positions to obtain the target refresh signal;

wherein the second intermediate image is an image obtained by splicing the second image with a cursor image corresponding to the cursor information according to a cursor position before the change.

9. The device according to claim 7, wherein the controller is further configured to:

perform pixel value comparison on the first image and the second image at corresponding pixel positions to obtain other refresh signals of the plurality of refresh signals except for the target refresh signal.

10. The device according to claim 7, wherein:

a plurality of target refresh signals are provided, and the plurality of target refresh signals have a refresh sequence;

a first refresh signal in sequence of the target refresh signals at least corresponds to the second image before the cursor change; and a last refresh signal in sequence of the target refresh signals at least corresponds to the first image after the cursor change.

11. The device according to claim 10, wherein:

in the plurality of target refresh signals, for the same cursor change, a number of target refresh signals for transitioning from displaying the cursor to not displaying the cursor is equal to a number of target refresh signals for transitioning from not displaying the cursor to displaying the cursor.

12. The device according to claim 7, wherein:

the cursor information includes information corresponding to at least one cursor change; and the cursor change includes a cursor image change and/or cursor position change.

13. An image output control method comprising:

receiving a first image sent by a graphics processor;

receiving cursor information generated based on a cursor change;

determining a target refresh signal according to the first image, a second image, and the cursor information, the target refresh signal including at least one refresh signal of a plurality of refresh signals, and the plurality of refresh signals being used to cause a display module to perform a plurality of refreshes to transition from displaying the second image to displaying the first image; and outputting the target refresh signal to the display module;

wherein determining the target refresh signal according to the first image, the second image, and the cursor information includes:

performing adjustment on a signal of at least one refresh signal of a plurality of initial signals corresponding to a target pixel area according to the cursor information to obtain the target refresh signal, the plurality of initial signals being obtained according to the first image and the second image and being used to obtain the plurality of refresh signals, and the target pixel area being a pixel area corresponding to the cursor in the first image and the second image.

14. The method according to claim 13, wherein performing the adjustment on the signal of at least one refresh signal of the plurality of initial signals corresponding to the target pixel area according to the cursor information to obtain the target refresh signal includes:

performing the adjustment on the signal of at least one refresh signal of the plurality of initial signals corresponding to the target pixel area according to a cursor image and/or cursor position of the cursor information to obtain the target refresh signal.

15. An image output control method comprising:

receiving a first image sent by a graphics processor;

receiving cursor information generated based on a cursor change;

determining a target refresh signal according to the first image, a second image, and the cursor information, the target refresh signal including at least one refresh signal of a plurality of refresh signals, and the plurality of refresh signals being used to cause a display module to perform a plurality of refreshes to transition from displaying the second image to displaying the first image; and outputting the target refresh signal to the display module; wherein:

a plurality of target refresh signals are provided, and the plurality of target refresh signals have a refresh sequence;

a first refresh signal in sequence of the target refresh signals at least corresponds to the second image before the cursor change; and a last refresh signal in the sequence of the target refresh signals at least corresponds to the first image after the cursor change.

* * * * *